(12) United States Patent
Resnick et al.

(10) Patent No.: US 8,906,448 B2
(45) Date of Patent: Dec. 9, 2014

(54) METHOD OF TREATING A MATERIAL TO ACHIEVE SUFFICIENT HYDROPHILICITY FOR MAKING HYDROPHILIC ARTICLES

(75) Inventors: Gennady Resnick, Prospect Heights, IL (US); Glenn M. Allen, Vernon, CT (US); Zebulon D. Vance, Jr., Plantsville, CT (US); Ned E. Cipollini, Enfield, CT (US)

(73) Assignee: Ballard Power Systems Inc., Burnaby (CA)

( * ) Notice: Subject to any disclaimer, the term of this patent is extended or adjusted under 35 U.S.C. 154(b) by 464 days.

(21) Appl. No.: 13/176,309

(22) Filed: Jul. 5, 2011

(65) Prior Publication Data

US 2012/0003382 A1    Jan. 5, 2012

Related U.S. Application Data

(63) Continuation of application No. 11/769,294, filed on Jun. 27, 2007, now abandoned, and a continuation-in-part of application No. 11/567,480, filed on Dec. 6, 2006, now abandoned, and a continuation-in-part of application No. 11/320,517, filed on Dec. 28, 2005, now abandoned.

(51) Int. Cl.
| | | |
|---|---|---|
| C04B 41/00 | (2006.01) | |
| C04B 35/628 | (2006.01) | |
| C04B 41/87 | (2006.01) | |
| H01M 8/02 | (2006.01) | |
| C04B 41/45 | (2006.01) | |
| C04B 41/50 | (2006.01) | |
| C04B 111/00 | (2006.01) | |

(52) U.S. Cl.
CPC .......... *C04B 41/4584* (2013.01); *C04B 41/009* (2013.01); *C04B 2235/528* (2013.01); *C04B 35/62823* (2013.01); *C04B 35/62821* (2013.01); *C04B 2235/5436* (2013.01); *C04B 41/87* (2013.01); *H01M 8/023* (2013.01); *C04B 35/62886* (2013.01); *C04B 2111/00853* (2013.01); *H01M 8/0232* (2013.01); *C04B 35/62818* (2013.01); *H01M 8/0234* (2013.01); *C04B 41/5041* (2013.01); *C04B 35/62813* (2013.01); *Y02E 60/50* (2013.01); *C04B 2235/425* (2013.01); *H01M 8/0245* (2013.01); *C04B 35/62807* (2013.01); *C04B 35/62805* (2013.01)
USPC ........................................................ 427/115

(58) Field of Classification Search
None
See application file for complete search history.

(56) References Cited

U.S. PATENT DOCUMENTS

| | | |
|---|---|---|
| 2,016,162 A | 10/1935 | Wilderman |
| 3,042,551 A | 7/1962 | Harkness |

(Continued)

FOREIGN PATENT DOCUMENTS

| | | |
|---|---|---|
| CN | 1206760 A | 2/1999 |
| EP | 0718903 A1 | 6/1996 |

(Continued)

OTHER PUBLICATIONS

Virgile'ev "Influence of structural defects on properties of reactor graphite," 2002 Inorganic Materials, vol. 38, 5, p. 471-475, 57-581.

(Continued)

*Primary Examiner* — Mandy Louie
(74) *Attorney, Agent, or Firm* — Seed IP Law Group PLLC

(57) ABSTRACT

An exemplary method of treating a material such as carbon or graphite to render at least some surfaces of the material hydrophilic includes coating at least a portion of the at least some surfaces with an oxygenated element and controlling a rate of a breakdown of the oxygenated element to leave a corresponding elemental oxide on the surfaces. In one example, the material is treated before being incorporated into an article comprising the material. Another example method includes treating an article comprising the material. Disclosed examples include precipitation or decomposition as the breakdown of the oxygenated element.

17 Claims, 3 Drawing Sheets

(56) References Cited

U.S. PATENT DOCUMENTS

| | | | |
|---|---|---|---|
| 3,272,434 | A | 9/1966 | Zettlemoyer et al. |
| 3,778,307 | A | 12/1973 | Beer et al. |
| 3,779,812 | A | 12/1973 | Witherspoon |
| 3,890,338 | A | 6/1975 | Wojtowicz et al. |
| 4,269,670 | A | 5/1981 | Smith |
| 4,680,048 | A | 7/1987 | Motoki et al. |
| 5,137,749 | A | 8/1992 | Yamazaki et al. |
| 5,219,611 | A | 6/1993 | Giannelis et al. |
| 5,228,911 | A | 7/1993 | Kunii et al. |
| 5,276,237 | A | 1/1994 | Mieville |
| 5,462,820 | A | 10/1995 | Tanaka |
| 5,840,414 | A | 11/1998 | Bett et al. |
| 5,858,462 | A | 1/1999 | Yamazaki |
| 5,885,729 | A | 3/1999 | Marchetti |
| 5,942,347 | A | 8/1999 | Koncar et al. |
| 6,004,525 | A | 12/1999 | Tani et al. |
| 6,156,409 | A | 12/2000 | Doushita et al. |
| 6,258,476 | B1 | 7/2001 | Cipollini |
| 6,515,631 | B1 | 2/2003 | Nakamura et al. |
| 6,706,442 | B1 | 3/2004 | Sakamoto et al. |
| 6,738,203 | B2 | 5/2004 | Ando et al. |
| 6,746,982 | B2 | 6/2004 | Hertel et al. |
| 6,766,817 | B2 | 7/2004 | de Silva |
| 6,797,424 | B2 | 9/2004 | Ooma et al. |
| 6,811,901 | B1 | 11/2004 | Arfsten et al. |
| 6,918,404 | B2 | 7/2005 | da Silva |
| 7,022,427 | B1 | 4/2006 | Biegert et al. |
| 7,066,586 | B2 | 6/2006 | da Silva |
| 2003/0054221 | A1 | 3/2003 | Saito et al. |
| 2003/0098236 | A1 | 5/2003 | Clark et al. |
| 2003/0124414 | A1 | 7/2003 | Hertel et al. |
| 2003/0162079 | A1 | 8/2003 | Ooma et al. |
| 2003/0211380 | A1 | 11/2003 | Hiroi et al. |
| 2004/0041294 | A1 | 3/2004 | Horiuchi et al. |
| 2004/0127621 | A1 | 7/2004 | Drzal et al. |
| 2004/0247978 | A1 | 12/2004 | Shimamune |
| 2004/0265670 | A1 | 12/2004 | Muller et al. |
| 2005/0001352 | A1 | 1/2005 | Ma et al. |
| 2005/0031942 | A1 | 2/2005 | Hennige et al. |
| 2005/0208304 | A1 | 9/2005 | Collier et al. |
| 2005/0221139 | A1 | 10/2005 | Hampden-Smith et al. |
| 2005/0233203 | A1 | 10/2005 | Hampden-Smith et al. |
| 2005/0255769 | A1 | 11/2005 | Henninge et al. |
| 2006/0040148 | A1 | 2/2006 | Blunk et al. |

FOREIGN PATENT DOCUMENTS

| | | |
|---|---|---|
| JP | 2000311695 | 7/2000 |
| WO | 9405049 | 3/1994 |
| WO | 0117050 A1 | 3/2001 |
| WO | 0154213 A1 | 7/2001 |
| WO | 03021697 A2 | 3/2003 |
| WO | 2007075212 A1 | 7/2007 |

OTHER PUBLICATIONS

Roulette, "Encyclopedia of Textile Finishing," 2001, Woodhead Pub. p. 102.

International Search Report and Written Opinion of the International Searching Authority for International application No. PCT/US2007/072231 mailed Dec. 4, 2007.

PCT International Search Report and Written Opinion of the International Search Authority mailed Jul. 2, 2007 for International application No. PCT/US2006/039408.

"The role of graphite surface group chemistry on graphite exfoliation during electrochemical lithium insertion," by Michael E. Spahr, Henry Wilhelm, Tiziana Polladino, Nicole Dupont-Pavlovsky, Dietrich Goers, Felix Joho, Petr Novak, Journal of Power Sources 119-121 (2003) 543-549.

"Determination of the absolute and relative extents of basal plane surface area and "non-basal plane surface" area of graphites and their impact on anode performance in lithium ion batteries," by James P. Oliver, Martin Winter; Journal of Power Sources, 97-98 (2001), 151-155.

M. Nakahara, Y. Sanada, "Modification of Pyrolytic Graphite Surface With Plasma Irradiation," Journal of Materials Science 28 (1993), pp. 1327-1333.

J. LePage, J. Menacourt, "Water Induced Anelasticity of Porous Media," Journal of Materials Science 33 (1998)k, pp. 2905-2917.

Mark T. McDermott, Kristin Kneten and Richard L. McCreery, "Anthraquinonedislafonate Absorption, Electron-Transfer Kinetics, and Capacitance on Ordered Graphite Electrodes: The Important Role of Surface Defects," J. Phys. Chem. 1992, 96, pp. 3124-3130.

International Preliminary Report on Patentability for International application No. PCT/US2006/039408 mailed Apr. 8, 2008.

"Surface-Modifying Treatment of Graphite Using Hydrolytic Co-Deposition Method," Yang, Zhi-hong, et al., Refractory Materials, 2001, vol. 35, No. 2, pp. 66-68.

M. Winter, P. Novak, A. Monnier, "Graphites for Lithium-Ion Cells: The Correlation of the First-Cycle Charge Loss with the Brunauer-Emmett-Teller Surface Area," J. Electrochem Soc. 1998, 145(2), 428-436.

C. Pham-Huu, N. Keller, V.V. Roddatis, G. Mestl, R. Schlogl, M.J. Ledoux, "Large scale synthesis of carbon nanofibers by catalytic decomposition of ethane on nickel nanoclusters decorating carbon nanotubes," Phys. Chem. Chem. Phys. 2004, 4, 514-521.

Y. H- Chu, et al., "Synthesis of Nanoporous Graphite-Derived Carbon-Silica Composites by a Mechanochemical Intercalation Approach," Feb. 2005, Langmuir 2005, 21, 2545-2551.

METHOD OF TREATING A MATERIAL TO ACHIEVE SUFFICIENT HYDROPHILICITY FOR MAKING HYDROPHILIC ARTICLES

CROSS-REFERENCE TO RELATED APPLICATIONS

This application is a continuation-in-part of U.S. application Ser. No. 11/320,517, which was filed on Dec. 28, 2005, now abandoned a continuation-in-part of U.S. application Ser. No. 11/567,480, which was filed on Dec. 6, 2006 now abandoned; and a continuation of U.S. application Ser. No. 11/769,294, which was filed on Jun. 27, 2007 now abandoned.

BACKGROUND

A variety of situations require hydrophilic articles. One example is within the fuel cell art. Many fuel cell arrangements include water transport plates for controlling water, air and fuel flow within a fuel cell assembly in a known manner. Traditionally, water transport plates have included porous, hydrophilic flow fields that include flow channels for directing fluid in a desired manner. Many such flow fields comprise graphite, a resin and a wettability component. For example, it is known to treat porous graphite plates with a metal oxide post-treatment to impart wettability to the plate. It is also known to add a metal oxide as one of the components for making a water transport plate. Another example includes adding hydrophilic carbon black. In many of those instances, the wettability component is added as a separate component in a mixture containing resin such that the resin binds the wettability component in place. There is no effect on the graphite, itself, using the traditional approach.

U.S. Pat. No. 5,942,347 shows one example technique where a porous bi-polar separator plate has at least one electronically conductive material, at least one resin and at least one hydrophilic agent. Each of these components is substantially uniformly distributed throughout the separator plate of that document. The hydrophilic agent in that document is selected from material such as oxides of Ti, Al, Si and mixtures of them. There are at least two difficulties with this approach. First, it is very difficult to uniformly distribute materials as suggested in that patent. Secondly, because the oxides are dielectric, using hydrophilic or wetting agents of the type described there can increase the electrical resistance of such a separator plate, which is undesirable. Therefore, it is difficult to achieve uniform distribution as suggested in that document without increasing electrical resistance.

Such wettability treatments or additives have been required because the graphite is generally hydrophobic. Without the wettability agent or treatment, traditional graphite based water transport plates are hydrophobic and not suitable for their intended use. Graphite particles comprise carbon atoms arranged in a manner that typically provides a relatively low surface energy such that the graphite particles are essentially hydrophobic. Carbon atoms within a graphite crystal are arranged in a plurality of generally parallel planes. The bonds between the carbon atoms within the planes are very strong. Graphite particle surfaces that are aligned with such planes (i.e., basal plane surfaces) have a relatively low surface energy.

It is desirable to provide an improved process for making hydrophilic articles such as water transport plates. For example, it would be useful to make the fabrication process less complicated and to reduce costs by taking a different approach that does not include the traditional wettability additives or wettability enhancing agents. This invention addresses that need.

SUMMARY

An exemplary method of treating a material to render at least some surfaces of the material hydrophilic includes coating at least a portion of the at least some surfaces with an oxygenated element and controlling a rate of a breakdown of the oxygenated element to leave a corresponding elemental oxide on the surfaces.

In one example, the material is treated before being incorporated into an article comprising the material. Another example method includes treating an article comprising the material. Disclosed examples include precipitation or decomposition as the breakdown of the oxygenated element. Disclosed examples include carbon and graphite as the material that is treated.

The various features and advantages of the disclosed examples will become apparent to those skilled in the art from the following detailed description. The drawings that accompany the detailed description can be briefly described as follows.

DETAILED DESCRIPTION

Disclosed example methods of treating a normally hydrophobic material such as carbon or graphite renders at least some surfaces of the material hydrophilic, which is useful for establishing a hydrophilicity or wettability for an article including that material.

Figure 1:
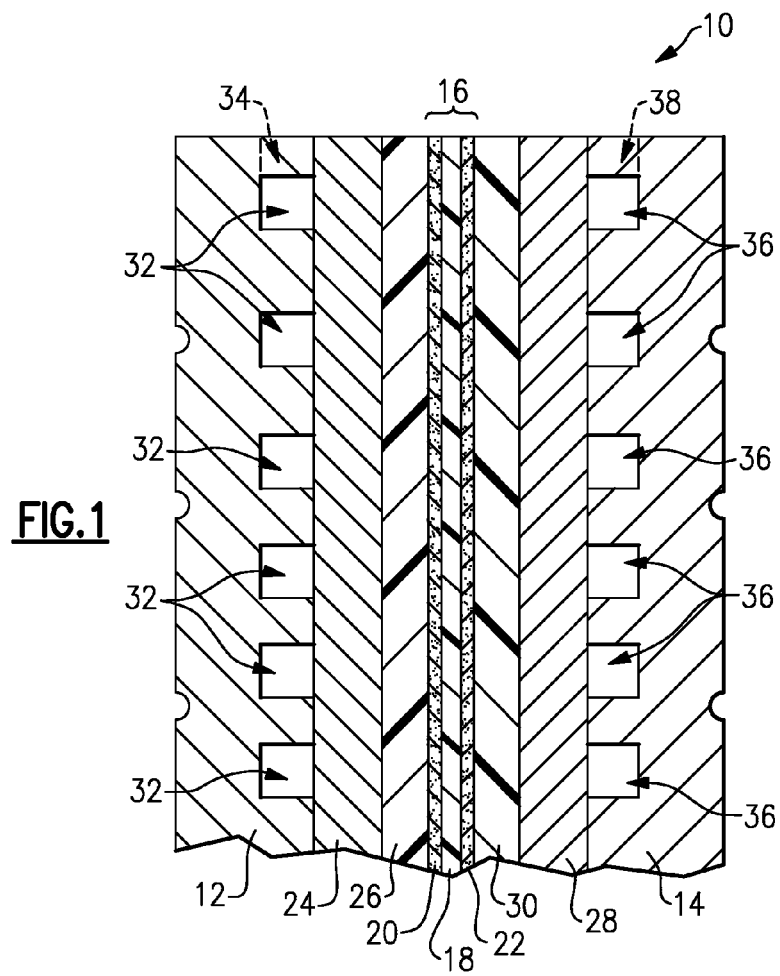
FIG. 1 schematically illustrates an example water transport plate assembly including a hydrophilic structure designed according to an embodiment of this invention.

One example use of such an article is in a fuel cell. FIG. 1 shows a schematic, cross-sectional representation of an electrochemical cell such as a fuel cell 10 for generating electrical energy from process oxidant and reducing fluid reactant streams. The example fuel cell 10 has a porous carbon body comprising a first or anode water transport plate 12 and a second or cathode water transport plate 14. The anode and cathode water transport plates 12, 14 are at opposed sides of the membrane electrode assembly 16, which includes a membrane electrode assembly 16 that consists of an electrolyte such as a proton exchange membrane 18, an anode catalyst 20 and a cathode catalyst 22. The illustration also shows bi-layer gas diffusion layers 24, 26 and 28, 30. In some examples only the layers 24 and 28 would be used as known.

The anode water transport plate 12 includes a plurality of fuel flow channels 32 that are in fluid communication with each other and with a fuel inlet 34 that receives the reducing fluid so that the fuel inlet 34 and flow channels 32 cooperate to pass the reducing fluid fuel through the fuel cell 10 in fluid communication with the anode catalyst 20. Similarly, the cathode water transport plate 14 includes a plurality of oxidant flow channels 36 that are in fluid communication with each other and with an oxidant inlet 38 that receives the process oxidant so that the oxidant inlet 38 and oxidant flow channels 36 cooperate to pass the process oxidant through the fuel cell 12 in fluid communication with the cathode catalyst 22.

Water transport plates serve many functions in a fuel cell. Namely, they deliver reactants to membrane electrode assembly catalysts; transport product water away from the cathode to prevent flooding; humidify the anode and/or cathode reactant streams; provide a wet seal barrier between reactants and/or coolants; and act as an electrical conductor to carry electrical current to the collectors. Accordingly, the pore structure must be designed to provide the desired capillary action and assure sufficient hydrophilicity to facilitate water movement. Some arrangements include porous and non-porous sections, but the porous sections must have sufficient hydrophilicity.

As mentioned above, the traditional approach for making water transport plates renders them hydrophobic unless a wettability agent has been incorporated as a raw material ingredient in the manufacturing process or in a post-treatment process. The graphite as used in many previous water transport plates is hydrophobic, or insufficiently hydrophilic, which has made it necessary to include a separate wettability agent.

There are other articles for which wettability and water transport properties are required. For example, some fuel cell applications utilize evaporative cooling. Some portions of such fuel cell arrangements require sufficient wettability to accomplish the desired water transport from the liquid zone to the evaporative zone. Another example article within a fuel cell that may need to be wettable or hydrophilic is the gas diffusion layer such as the layers 24 and 28. The carbon used for many previous gas diffusion layers is hydrophobic, or insufficiently hydrophilic, which has required adding a separate wettability agent to make a hydrophilic gas diffusion layer.

The hydrophilicity of an object is a surface property characteristic that describes wetting behavior, which is the interaction of a liquid with a solid. For example, wetting is observed in the spreading of a liquid over a surface, in penetration of a liquid into a porous medium, or in displacement of one liquid by another. Wetting refers to the macroscopic manifestation of molecular interaction between liquids and solids in direct contact at the interface between them. Increased wettability ensures uniform spreading of a liquid over a solid surface or better penetration of a liquid through a porous medium, for example.

Wettability is typically determined by the balance between adhesive forces between the liquid and solid and cohesive forces in the liquid. Adhesive forces cause a liquid drop to spread. Cohesive forces cause the liquid drop to remain balled up.

The contact angle between the liquid and the solid is determined by competition between the adhesive and cohesive forces. When a surface is wettable or hydrophilic, the contact angle with water is less than 90°. Hydrophilic materials possess high surface energy values and the ability to form "hydrogen bonds" with water. By contrast, hydrophobic or non-wettable materials have little or no tendency to absorb water so that water tends to "bead up" on the surface in the form of discrete droplets. The contact angle with water for hydrophobic surfaces is greater than 90°. Hydrophobic materials possess low surface energy values and lack active groups in the surface chemistry for forming "hydrogen bonds" with water.

We consider graphite as one example type of carbon for discussion purposes. To understand the wettability of graphite, it is useful to consider its structure. Graphite is composed of infinite layers of carbon atoms arranged in the form of hexagons (or rings) lying in planes. The layers are stacked parallel to each other. Each carbon atom within the plane is covalently bonded (e.g., is tightly bound) to three other carbon atoms. The atoms in alternative planes align with each other and are loosely bonded by van der Waals forces.

Figure 2A:
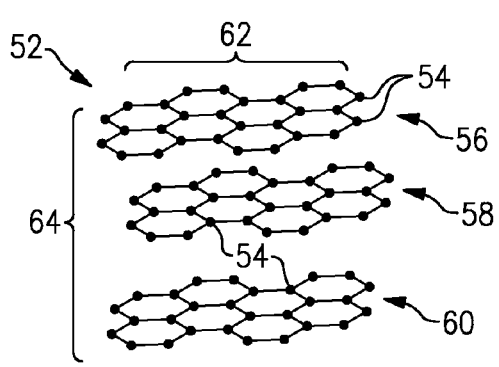
FIG. 2A schematically shows a feature of a crystal structure of an example graphite particle.
Figure 2B:
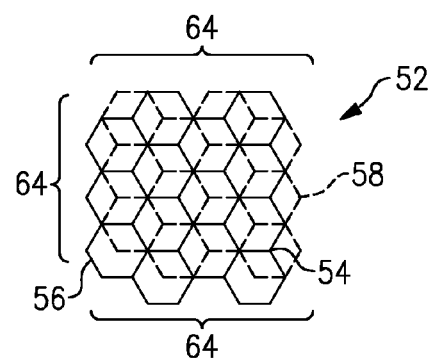
FIG. 2B schematically shows another view of the crystal structure of FIG. 2A.

FIGS. 2A and 2B schematically illustrate an example crystalline structure of a portion of an example graphite particle 52. A plurality of carbon atoms 54 are arranged into a plurality of hexagons that lie within a plurality of planes. The illustration includes a first plane 56, a second plane 58 and a third plane 60. The covalent bonds between the carbon atoms 54 within the planes are very strong. The bonds between carbon atoms of one plane and carbon atoms of another plane, on the other hand, are much weaker.

Surface areas on the graphite particle aligned with the planes (e.g., generally parallel to the first plane 56) are referred to as a basal plane surface such as that schematically shown at 62. Ideal basal plane surfaces, which means defect free and contamination free, are homogenous, generally "smooth" and consist only of carbon atoms. Each graphite particle will have at least one basal plane surface 62 and at least one prismatic surface 64. The usual shape of graphite powder is platelets or flakes with basal sites that have a low surface energy. Flake graphite has a majority of the overall graphite particle surface area within a basal plane surface.

The strong bonds between the carbon atoms 54 within the basal planes yields a relatively low basal plane surface energy and a resulting hydrophobic surface.

The relatively weaker bonds (from van der Waals forces) between carbon atoms in different planes provides a higher surface energy along prismatic surfaces 64. The prismatic surfaces are distinguishable from basal plane surfaces 62 because the prismatic surfaces are arranged at least partially oblique to the orientation of the planes 56, 58 and 60, for example. It is sufficient for purposes of discussion to understand that normally there is a different surface energy on the basal plane surfaces 62 compared to the surface energy on the prismatic surfaces 64.

The relatively weak links between carbon atoms along the prismatic surfaces 64 and the heterogeneous nature of the prismatic surfaces (e.g., prismatic surfaces typically include various, mostly oxygen-containing functional surface groups along with the carbon atoms) gives the prismatic surfaces 64 a higher surface energy. The prismatic surface 64 can be considered a polar surface. As a result, the prismatic surfaces 64 are hydrophilic and can form strong hydrogen bonds with water molecules.

The hydrophobic and hydrophilic character of the graphite surfaces on a graphite particle can be characterized by a wettability ratio, which can be expressed by the following relation:

$$\text{Wettability Ratio} = \frac{\text{The hydrophilic surface area}}{\text{The total surface area}}$$

According to this definition, the wettability ratio can vary significantly: from almost one (for theoretical, ideal, perfectly sphere shaped graphite which has all surface area formed by the prismatic surfaces) to a very low value for graphite with predominantly basal plane surface. The higher the wettability ratio of graphite, the better its wettability.

In one example, the wettability ratio equals the ratio of prismatic surface area to the total surface area.

Prismatic (e.g., hydrophilic) surface area and total surface area can be determined experimentally. The hydrophilic (and hydrophobic) character of graphite surfaces can be determined by absorption calorimetry, or by flow microcalorimetry. The total surface area can be determined by the Brunauer, Emmett and Teller (BET) method. A very exact method useful in breaking down the total surface area of graphite into fractions of basal plane surfaces and prismatic surfaces is krypton gas absorption.

The relative hydrophilicity between differing graphites can be determined using known techniques such as the Washburn method (or Capillary Rise Method), which is well known from published literature. This technique allows for obtaining the values of contact angles, which indicates in a relative manner whether a surface is hydrophilic (i.e., wettable) or hydrophobic.

One example embodiment of this invention includes the realization that increasing the amount of prismatic surface area within graphite used for forming a hydrophilic article establishes sufficient wettability for the article to meet the hydrophilicity needs of a particular situation. It has been found, for example, that using sufficiently wettable graphite particles as at least a portion of the graphite used to make the article can establish a sufficient wettability to meet the needs for many fuel cell applications.

One example includes selecting graphite particles having a wettability ratio, which is the ratio of the hydrophilic surface area to the total surface area, within a range sufficient to make the resulting article hydrophilic. In other words, selecting enough of the graphite particles to have a particular physical characteristic results in enough wettable (e.g., prismatic) surface area compared to the hydrophobic (e.g., basal plane) surface area to render the resulting article hydrophilic. By appropriately selecting graphite particles, the wettability of a hydrophilic structure can be established purely by the graphite particles.

In one example, the selected graphite particles have a wettability ratio that is more than about 0.10. This is achieved in one example, by selecting graphite particles that have at least about 10% prismatic surface area with a remaining percentage basal surface area.

One example includes selecting graphite particles having a wettability ratio greater than 0.18. In this example, provided that there are enough graphite particles having at least about 18% wettable (e.g., prismatic) surface area, sufficient wettability can be obtained for many fuel cell water transport plate applications. One example includes selecting graphite particles that are generally spheroidal. Such particles have more prismatic surface area than flake graphite. One particular example includes spheroidal graphite particles as the majority of the graphite. Another example includes spheroidal graphite particles, exclusively. Strategically controlling the amount and type of graphite particles that are included will provide wettability in an amount sufficient to meet the needs of a given situation.

A variety of commercially available spheroidal graphite materials are known. Prior to this invention, however, no one has considered the wettability aspects of such particles. Instead, they have been always used with a wettability agent. U.S. Pat. No. 6,746,982, for example, mentions the use of Timcal KS75 and KS150 graphite, both of which are spheroidal. That patent teaches adding a wettability treatment.

U.S. Pat. No. 6,926,995 suggests using natural or synthetic graphite for a porous separator plate and teaches that the graphite is not subject to any particular limitation. That patent is another example of the traditional thinking that adding a hydrophilic agent is necessary to achieve wettability.

Wettability agents typically have been introduced along with resin and graphite particles. In those instances, wettability agents have been secured to the structure or made part of the structure by the binding action of the resin. In other words, the wettability agents did not directly impact the graphite because they were present within the composite and typically held in position by the resin.

As mentioned above, one example implementation of this invention includes using generally spheroidal graphite particles because of their relatively higher percentage of prismatic surface area compared to flake graphite, for example. Another example includes using expanded graphite particles to achieve the desired wettability ratio. Expanded graphite particles are known. Expanded graphite particles have larger distances between the parallel plane of carbon atoms, which provides an increased prismatic surface area compared to non-expanded graphite particles. One embodiment of this invention includes using at least some expanded graphite particles within the graphite to provide hydrophilicity to a resulting article.

Another example includes pretreated graphite particles that have increased wettable surface area compared to pure or untreated graphite. In one example, the basal plane surface of the pretreated graphite particles have some wettability along with the wettability of the prismatic surfaces such that a higher percentage of hydrophilic surface area exists compared to pure or untreated graphite.

One example includes treating the basal surfaces of the graphite to create defects on the basal planes using a plasma, laser or other surface treatment. Defects on the basal planes will interrupt or interfere with the otherwise present strong covalent bonds between the carbon atoms, which will increase the surface energy and the wettability of a basal surface. In such an example, at least some of the basal plane surface area can be considered as part of the hydrophilic surface area along with the already hydrophilic prismatic surface area.

Another example includes using a deposition process to effectively modify a surface of an otherwise hydrophobic material such as the basal surface of graphite particles. Examples include coating at least a portion of at least some surfaces of the hydrophobic material with an oxygenated element and controlling a rate of a breakdown of the oxygenated element to leave a corresponding elemental oxide on the surfaces. One example method includes decomposition as at least part of the breakdown of the oxygenated element. Another example method includes precipitation as at least part of the breakdown of the oxygenated element.

In one example, pure graphite is mixed with an organic titanate in an ethanol solution. One example includes using Tyzor® (tetra n-butyl titanate (TnBT)), which is available from Dupont. In one example, the amount of titania ($TiO_2$) constitutes 0.4-0.5 mass % of the graphite.

Organic butyl titanate solution is mixed with a solvent (denatured ethanol) and graphite. The butyl titanate and solvent undergo a metathetical ligand exchange (room temperature decomposition) to form titanium tetraethanolate, butanol, and ethanol. The alcohols are then decanted, and the resulting slurry is then heated at 350° C. to completely decompose the remaining organic components, resulting in $TiO_2$ being deposited on the basal plane surface of the graphite.

When such an organic butyl titanate solution is heated, ethanol will be evaporated and butyl titanate will be decomposed into $TiO_2$ by the following reaction:

$$Ti(OCH_4H_9)_4 + 4(C_2H_5OH) ==> Ti(OC_2H_5)_4 + 4(C_4H_9OH) ==> Ti(OC_2H_5)_4 + heat(350° C.) ==> T_iO_2$$

The result is the presence of $TiO_2$ on surfaces of the graphite particles. The deposited $TiO_2$ on the graphite particles renders those surfaces at least partially wettable. We believe the presence of unsaturated Ti atoms, which can be easily combined with oxygen atoms in water to form Ti—OH layers, renders such a surface hydrophilic or wettable. On some surfaces, 2-3 layers of physically absorbed water are further formed.

From one perspective, pretreating graphite as described above increases the surface energy of the surfaces where the $TiO_2$ is deposited. In some example embodiments of this invention, the pretreated graphite particles include basal plane surfaces with a higher surface energy compared to untreated graphite such that the pretreated basal surfaces are hydrophilic.

In one particular example, 25 g of graphite powder KS5-75TT (d90=70 micron) was added to 40 ml of an ethyl solution and mixed at approximately 1000 rpm in a 3-propeller Barnant mixer. A selected amount of Tyzor® (0.5326 g of Tyzor® TnBT 23.5 mass % $TiO_2$ in 25 g of graphite) was dissolved into 50 ml of the ethanol solution and added to the graphite slurry. The mixture was stirred for fifteen minutes and placed in a large glass dish. That was then placed into a nitrogen purged oven in which the temperature was slowly ramped to 200° C. at a rate of 10° C. per minute. The graphite resided isothermally at 200° C. for 20 minutes and then the temperature was ramped to 350° C. at a rate of 10° C. per minute. In this example, the temperature of 350° C. was maintained for 10 minutes before turning off the oven and letting it cool down slowly to room temperature.

In one example, deposited $TiO_2$ was examined qualitatively using Energy Dispersive Spectroscopy (EDS) and quantitatively by Inductively Coupled Argon Plasma (ICP). The EDS results confirmed the presence of $TiO_2$ on the graphite and the ICP results demonstrated that the amount of $TiO_2$ was close to 0.5 mass % of graphite. The surface morphology of the deposited $TiO_2$ was characterized using Scanning Electron Microscopy (SEM). White deposits of $TiO_2$ were seen on the basal plane surface of graphite particles and their estimated dimensions were in a nanometer range.

In the just-described example, the graphite particles were treated to have $TiO_2$ deposited on at least one basal surface of the graphite particles before they were used for making a hydrophilic article, such as a plate for use in a fuel cell. One example article into which such treated graphite particles are incorporated comprises a water transport plate for use in a fuel cell.

In another example, at least one other oxygenated element and corresponding elemental oxide is used for treating the graphite particles using the same controlled breakdown process (e.g., decomposition). One example includes using a zirconate and depositing $ZrO_2$ on basal plane surfaces of at least some of the treated particles. Another example includes $SiO_2$ based upon a silicate. Other examples include oxides based on at least one of a stannate, an aluminate or a tantalate.

Any of the above oxygenated elements used for forming the oxide to treat the graphite particle basal surfaces can be processed in the manner described above for the example that results in $TiO_2$ deposits. Any one of the mentioned oxygenated elements could be used or a combination of them could be used to provide the oxides.

In one example, the article is made before the material (e.g., graphite or carbon) is treated. In one example, an article is first formed and then subsequently treated to increase the surface energy of surfaces on graphite particles by depositing $TiO_2$ on the particles within the article. Wettability is also increased because the $TiO_2$ is deposited on any existing binder such as a resin binder. Example articles treated in this manner include water transport plates and gas diffusion layers.

In one particular example, 1.0654 g of 0.5 mass % organic titanate (in the form known as Tyzor® TnBt) was weighed into a 100 mL beaker with 50 g of denatured ethanol (JT Baker, PSIII-Product No. 9287). A 2×2 inch sample of a porous graphite plate was placed into the solution and subjected to vacuum impregnation. The sample was subsequently dried at room temperature for 30 minutes. The sample was then backfilled by placement into a solution of 4.7 mass % of dionized water (36.03 g) in 764.5 g denatured ethanol for 30 minutes at room temperature. The sample was then placed into an oven at 115° C. (240° F.).

The resulting sample had an increased hydrophilicity compared to the sample before the example treatment process. The resulting deposition of $TiO_2$ on at least some basal surfaces of graphite particles increase the hydrophilicity of those particles, which renders the article hydrophilic. The solvent (denatured ethanol) has the effect of slowing down a rate of precipitation (i.e., breakdown) of titania from the titanate. Without the solvent, mixing moisture from air and a titanate such as Tyzor® results in an essentially instantaneous reaction resulting in precipitated titania ($TiO_2$) from the titanate. Using a solvent in one example allows for controlling the rate of precipitation. This allows for an article to be coated with the titanate before precipitation. In one example, this results in a much higher hydrophilicity because it is believed that the attachment of the oxygenated element to the graphite prior to the breakdown (i.e., precipitation) allows a far greater incidence of the elemental oxide (e.g., titania) deposited on the graphite.

Figure 3:
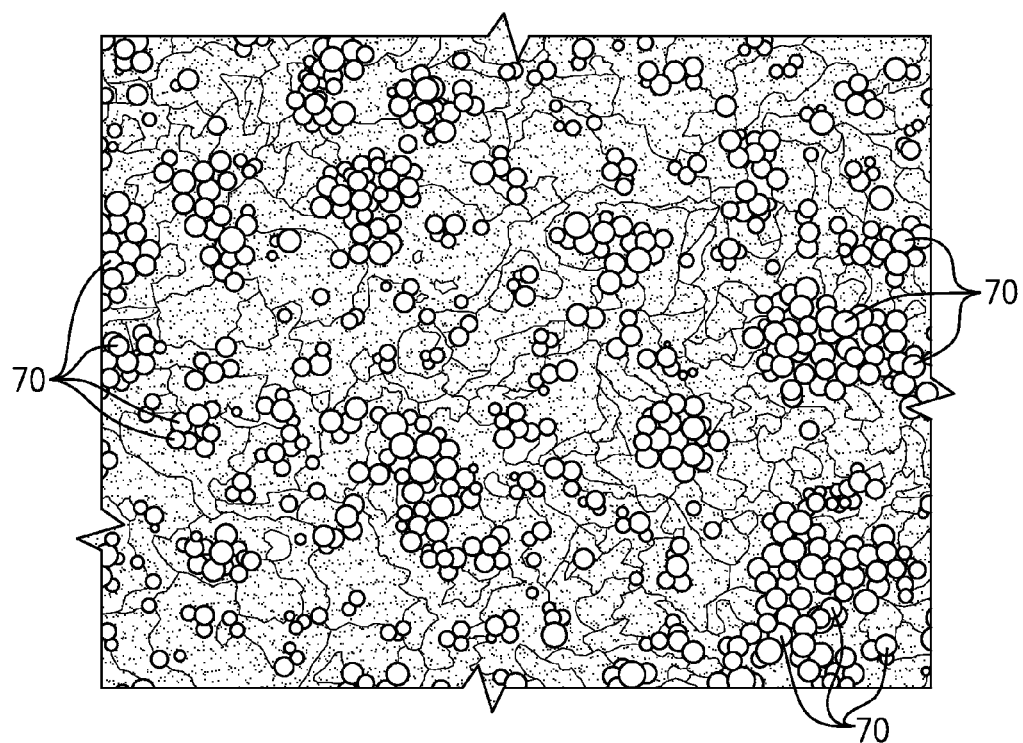
FIG. 3 illustrates elemental oxide deposition results obtained in one example embodiment of this invention.
Figure 4:
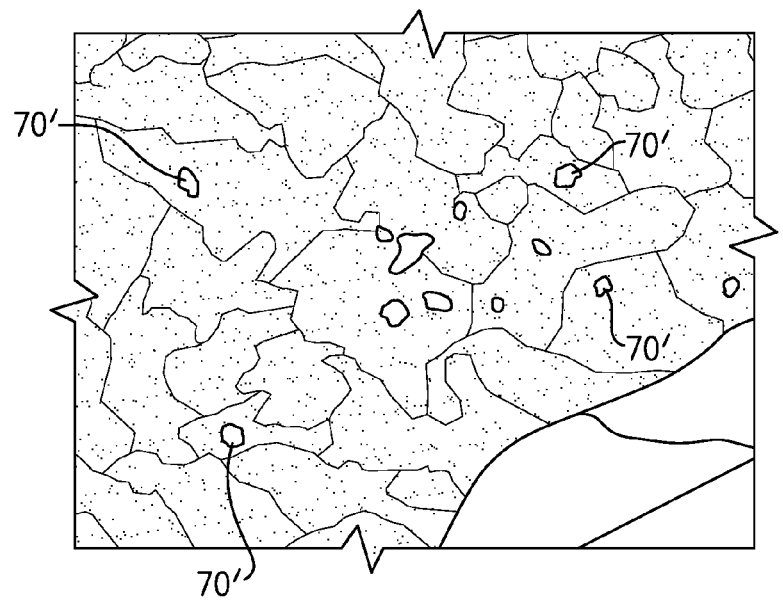
FIG. 4 illustrates elemental oxide deposition results obtained in an example embodiment according to the prior art.

FIG. 3 shows the results obtained in one example. The elemental oxide deposits are shown at 70. The incidence of such deposits is much greater in FIG. 3 compared to the deposits 70' as shown in FIG. 4, which is consistent with the results obtained using a previous approach where there is no control over the breakdown of titanate so that titania is precipitated before introducing the graphite article. In other words, the example approaches that include coating graphite particle surfaces with an oxygenated element and controlling a breakdown rate to leave the corresponding elemental oxide on the surfaces provide more elemental oxide deposition and higher hydrophilicity. Another feature of the example results shown in FIG. 3 is that the elemental oxide deposits 70 are essentially sphere-shaped, which is indicative of a completed chemical reaction. By contrast, the deposits 70' in FIG. 4 are randomly shaped, which is the type of result obtained when titania is allowed to form in a mixture before an article comprising graphite is introduced into the mixture.

One advantage to an approach for treating an article comprising graphite compared to pretreating the graphite particles themselves is that the article treatment approach can provide the intended hydrophilicity using lower temperatures, which requires less energy. Another advantage is that the associated cost, complexity and required time are reduced compared to pretreating graphite particles. Another advantage is that all constituents within the article will be rendered at least somewhat hydrophilic because the elemental oxide (e.g., $TiO_2$) is deposited everywhere on the article.

Figure 5:
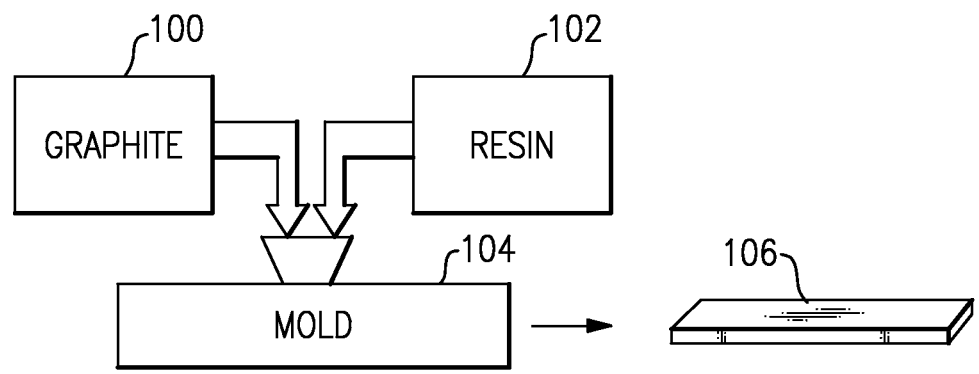
FIG. 5 schematically illustrates an example manufacturing process.

FIG. 5 schematically shows one example technique of making a hydrophilic article designed according to an embodiment of this invention. A graphite supply 100 includes a plurality of graphite particles having a wettability ratio of a hydrophilic surface area to a total surface area that is within a range sufficient to make the article hydrophilic as discussed above. In one example, the included plurality of graphite particles are generally spheroidal. In another example, the plurality of included graphite particles comprise expanded graphite. In still another example, the included plurality of graphite particles comprise pretreated graphite having an altered basal plane surface that is hydrophilic. One example comprises a basal plane surface including elemental oxide (e.g., $TiO_2$) deposits. Another example in which an article is formed prior to the treatment of the graphite includes an elemental oxide on basal plane surfaces of graphite particles in which the elemental oxide results from using at least one of a titanate, zirconate, stannate, aluminate, silicate or tantalate.

Figure 6:
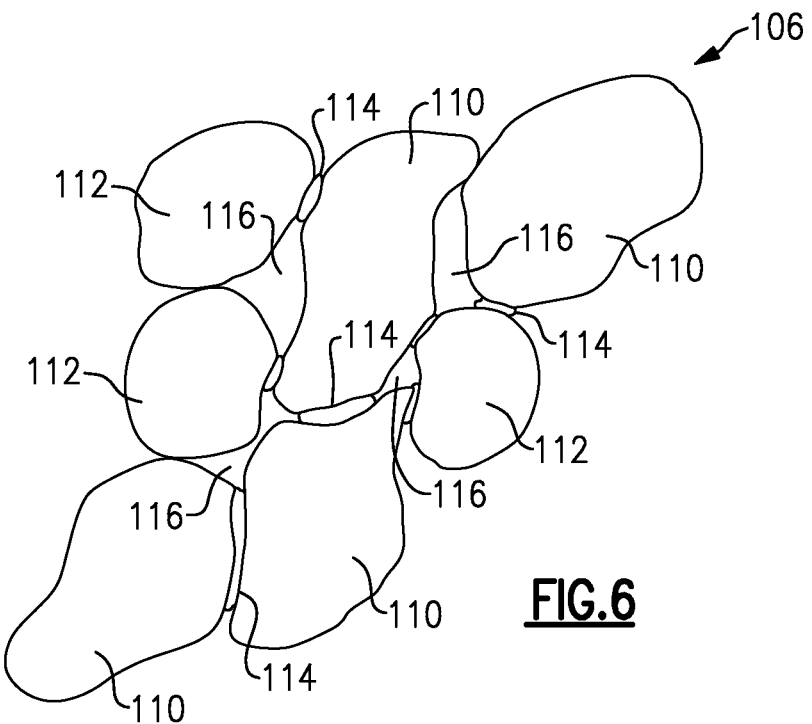
FIG. 6 schematically illustrates a portion of an example article made from the example process of FIG. 5.

The graphite from the supply 100 is mixed with a resin 102 and a mold 104 is used to form a resulting article 106. FIG. 6 schematically shows a portion of the resulting article 106. In the example of FIG. 6, the article is porous and includes some graphite particles that are traditional flake graphite shown at 110 and other graphite particles that have a wettability ratio that is within a range sufficient to make the article hydrophilic. These graphite particles are shown at 112. The resin from the supply 102, which binds together graphite particles, is schematically shown at 114. Voids or passages 116 exist between graphite particles, which renders the resulting article porous. In one example, the wettable surface of the graphite particles 112 is adjacent to or within the voids or passages 116.

Depending on the performance characteristics required for the resulting article and the type of graphite selected for forming the article, different wettability ratios will provide the intended results for different operating conditions. Given this description, those skilled in the art will be able to select appropriate wettability ratios and percentages of appropriate graphite particles to provide a hydrophilic article that meets their particular needs without requiring a wettability agent or additive in the graphite-resin mixture.

Graphite is used in the examples described above as one example type of carbon that can be treated in accordance with the disclosed methods. Another example includes carbon as the material that is treated to render at least some surfaces of the carbon hydrophilic. Untreated carbon is otherwise a generally hydrophobic material. In one particular example, a gas diffusion layer comprising carbon is treated by coating at least a portion of at least some surfaces of the carbon with an oxygenated element. Controlling a rate of a breakdown of the oxygenated element (e.g., by including one of the example solvents mentioned above in the mixture) allows for leaving deposits of the corresponding elemental oxide on the surfaces of the carbon. This renders the treated carbon hydrophilic enough to provide the desired wettability or hydrophilicity of the article (e.g., the gas diffusion layer) for its intended use in a fuel cell, for example.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of making an article, comprising the steps of:
   forming the article of a material comprising graphite particles having basal surfaces, at least a portion of the article being porous,
   coating at least the basal surfaces of the graphite particles of at least the porous portion of the article with a non-metallic oxygenated element comprising a silicate;
   controlling a rate of a breakdown of the oxygenated element to leave a corresponding elemental oxide on the basal surfaces of the graphite particles of the porous portion; and
   wherein the article comprises a fuel cell transport plate or a fuel cell gas diffusion layer.

2. The method of claim 1, wherein the breakdown comprises decomposition.

3. The method of claim 1, wherein the breakdown comprises precipitation.

4. The method of claim 1, comprising mixing the oxygenated element with a solvent to control the rate of breakdown.

5. The method of claim 4, comprising using the solvent to slow a rate of at least one of decomposition or precipitation.

6. The method of claim 4, comprising combining the oxygenated element and the solvent to establish a solution; and
   impregnating the material with at least some of the solution.

7. The method of claim 6, comprising subjecting the material in the solution to vacuum impregnation.

8. The method of claim 6, comprising
   subsequently drying the article;
   subsequently placing the dried article into a second solution comprising water and a solvent; and
   subsequently heating the article.

9. The method of claim 8, wherein the second solution comprises deionized water and denatured ethanol.

10. The method of claim 8, comprising heating the article at a temperature greater than 100° C.

11. The method of claim 4, comprising
    heating a mixture of the oxygenated element, the material and the solvent to a first temperature;
    subsequently heating the heated mixture to a second, higher temperature; and
    subsequently allowing the mixture to cool to room temperature.

12. The method of claim 11, comprising
    increasing a temperature of a device used to heat the mixture at a controlled rate to reach the first temperature; and
    increasing the temperature from the first temperature to the second, higher temperature at approximately the same controlled rate.

13. The method of claim 11, comprising
    maintaining the heated mixture at the first temperature for a first amount of time; and
    maintaining the heated mixture at the second temperature for a second amount of time that is approximately half as long as the first amount of time.

14. The method of claim 11, wherein the second, higher temperature is greater than 300° C.

15. The method of claim 4, wherein the solvent comprises at least one of an ethyl solution, an ethanol solution or a denatured ethanol.

16. A method of treating a material that comprises carbon to render at least some surfaces of the material hydrophilic, comprising the steps of:

forming a fuel cell component of the material, at least a portion of the fuel cell component being porous, the porous portion including graphite particles having a basal surface;

coating at least the basal surface of the graphite particles of the porous portion with an oxygenated element;

controlling a rate of breakdown of the oxygenated element to leave a corresponding elemental oxide on the basal surfaces of the porous portion;

mixing the oxygenated element with a solvent to control the rate of breakdown;

heating a mixture of the oxygenated element, the material and the solvent to a first temperature;

increasing a temperature of a device used to heat the mixture at a controlled rate to reach the first temperature;

subsequently heating the heated mixture to a second, higher temperature;

increasing the temperature from the first temperature to the second, higher temperature at approximately the same controlled rate; and subsequently allowing the mixture to cool to room temperature.

17. The method of claim 16, wherein the fuel cell component comprises a transport plate or a gas diffusion layer.

* * * * *